United States Patent
Homma (10) Patent No.: US 9,054,350 B2
(45) Date of Patent: Jun. 9, 2015

(54) FUEL CELL STACK

(75) Inventor: Hiroki Homma, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 13/824,245

(22) PCT Filed: Oct. 26, 2011

(86) PCT No.: PCT/JP2011/075232
§ 371 (c)(1),
(2), (4) Date: Mar. 15, 2013

(87) PCT Pub. No.: WO2012/073640
PCT Pub. Date: Jun. 7, 2012

(65) Prior Publication Data
US 2013/0177829 A1    Jul. 11, 2013

(30) Foreign Application Priority Data
Dec. 1, 2010   (JP) .................... 2010-267952

(51) Int. Cl.
*H01M 2/38* (2006.01)
*H01M 8/02* (2006.01)
*H01M 8/12* (2006.01)
*H01M 8/24* (2006.01)
*H01M 8/10* (2006.01)

(52) U.S. Cl.
CPC .......... *H01M 8/0273* (2013.01); *H01M 8/2485* (2013.01); *H01M 8/2465* (2013.01); *H01M 8/10* (2013.01); *H01M 8/0282* (2013.01); *H01M 8/1226* (2013.01); *H01M 8/247* (2013.01); *H01M 8/2475* (2013.01); *Y02E 60/521* (2013.01); *Y02E 60/525* (2013.01)

(58) Field of Classification Search
CPC ... H01M 8/10; H01M 8/2465; H01M 8/2485; H01M 8/247
USPC .......................................................... 429/457
See application file for complete search history.

(56) References Cited

U.S. PATENT DOCUMENTS

| | | | |
|---|---|---|---|
| 8,530,107 B2 * | 9/2013 | Ogawa et al. ................. | 429/456 |
| 2008/0182152 A1 * | 7/2008 | Erikstrup ......................... | 429/34 |
| 2012/0028159 A1 * | 2/2012 | Nielsen et al. ................. | 429/454 |

FOREIGN PATENT DOCUMENTS

| | | |
|---|---|---|
| JP | 06-036783 | 2/1994 |
| JP | 09-139223 | 5/1997 |
| JP | 2006-339035 | 12/2006 |
| JP | 2007-073359 | 3/2007 |
| JP | 2009-500525 | 1/2009 |
| WO | 2007/001189 | 1/2007 |
| WO | 2010/102815 | 9/2010 |

* cited by examiner

*Primary Examiner* — Jane Rhee
(74) *Attorney, Agent, or Firm* — Rankin, Hill & Clark LLP (57) ABSTRACT

A fuel cell stack includes a stack body formed by stacking a plurality of solid oxide fuel cells. The fuel cell stack includes a lower end plate, a load plate, and a fuel cell support member. The lower end plate is positioned at one end of the stack body in the stacking direction for placing the stack body on the lower end plate. The load plate is provided at the other end of the stack body for applying a load to the stack body in the stacking direction. The fuel cell support member is provided between the load plate and the stack body, and includes a composite layer made of alumina fiber and vermiculite.

7 Claims, 12 Drawing Sheets

PRIOR ART

FIG. 12
PRIOR ART

FUEL CELL STACK

TECHNICAL FIELD

The present invention relates to a fuel cell stack including a stack body formed by stacking a plurality of solid oxide fuel cells. Each of the solid oxide fuel cells is formed by stacking an electrolyte electrode assembly between separators. The electrolyte electrode assembly includes an anode, a cathode, and an electrolyte interposed between the anode and the cathode.

BACKGROUND ART

Typically, solid oxide fuel cells (SOFC) employ an electrolyte of ion-conductive oxide such as stabilized zirconia. The electrolyte is interposed between an anode and a cathode to form an electrolyte electrode assembly (MEA). The electrolyte electrode assembly is interposed between a pair of separators (bipolar plates). In use, generally, a predetermined numbers of the separators and the electrolyte electrode assemblies are stacked together to form a fuel cell stack.

In this type of fuel cell stack, in order to obtain the output voltage efficiently, the fuel cells need to be stacked together under the desired pressure. Further, in order to prevent leakage of the reactant gas such as the fuel gas and the air as much as possible, reactant gas manifolds need to be sealed reliably by applying pressure to the reactant gas manifolds in the stacking direction.

Figure 11:
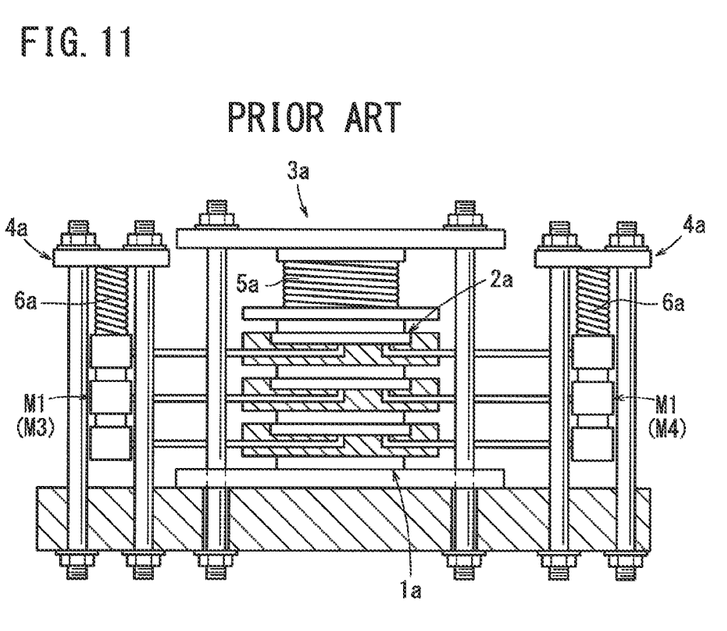
FIG. 11 is a cross sectional view showing a flat plate type solid oxide fuel cell disclosed in Japanese Laid-Open Patent Publication No. 2006-339035.

In this regard, for example, as shown in FIG. 11, a flat plate type solid oxide fuel cell disclosed in Japanese Laid-Open Patent Publication No. 2006-339035 includes a cell stack $1a$ and four manifolds M1 to M4 provided around the cell stack $1a$. A fuel gas and an oxygen-containing gas are supplied to, and discharged from each of unit cells $2a$ through the manifolds M1 to M4.

A first pressure applying mechanism $3a$ applies pressure to the cell stack $1a$, and a second pressure applying mechanism $4a$ applies pressure to the manifolds M1 to M4. The first pressure applying mechanism $3a$ includes a compression spring $5a$ as pressure applying means, and the second pressure applying mechanism $4a$ includes a compression spring $6a$ as pressure applying means.

Figure 12:
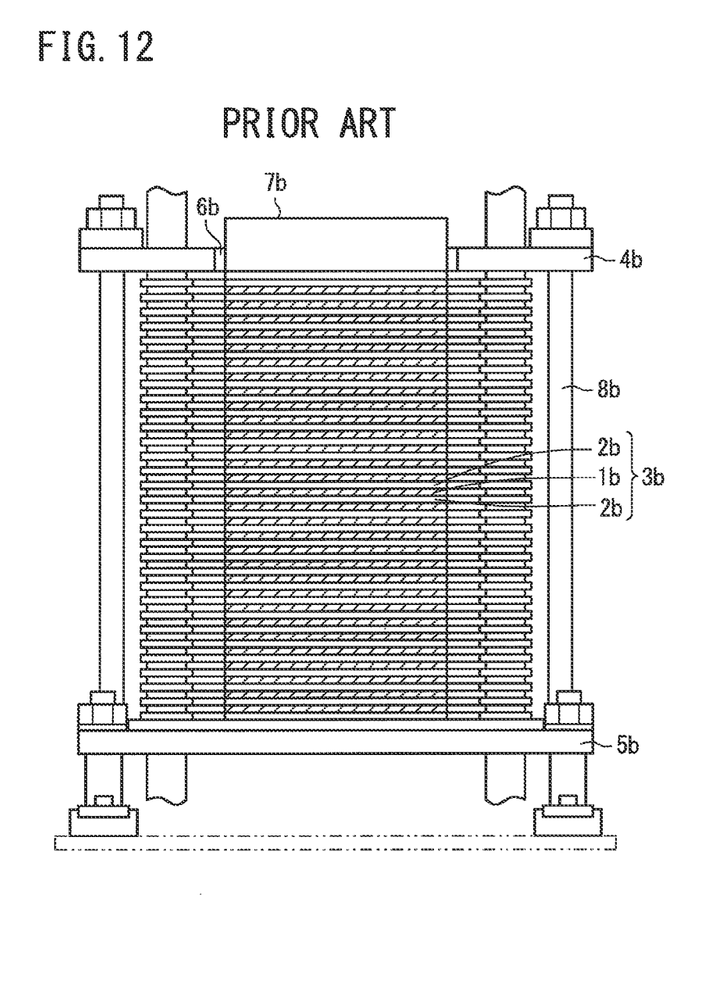
FIG. 12 is a cross sectional view showing a fuel cell disclosed in Japanese Laid-Open Patent Publication No. 2007-073359.

Further, in a fuel cell disclosed in Japanese Laid-Open Patent Publication No. 2007-073359, as shown in FIG. 12, a large number of units $3b$ each formed by sandwiching a power generation cell $1b$ between a pair of separators $2b$ are stacked together. At both ends (upper and lower ends) in the stacking direction of the fuel cell, an upper tightening plate $4b$ and a lower tightening plate $5b$ are provided. A large circular hole $6b$ is formed at the center of the upper tightening plate $4b$. The circular hole $6b$ is larger than the outer shape of the power generation cell $1b$, and a weight $7b$ is placed in the circular hole $6b$.

The upper tightening plate $4b$ and the lower tightening plate $5b$ are tightened together by a plurality of bolts $8b$ to apply a tightening load in the stacking direction to the units $3b$. By a load applied by the weight $7b$, a plurality of power generating elements of the units $3b$ tightly contact each other.

Further, a cell stack disclosed in Japanese Laid-Open Patent Publication No. 2009-500525 (PCT) includes at least one electrochemical cell interposed between a first end plate connected to an electrically conductive bolt and a second end plate connected to another electrically conductive bolt.

The cell stack includes a housing, means for fixing the cell stack to this housing to support the cell stack, and means for applying a mechanical load at a constant level to the entire fuel cell stack. The means for applying the load at the constant level includes at least one elastic pad inserted into a space between the cell stack and a wall of the housing. For example, the elastic pad is a silicone pad, and has insulating property.

SUMMARY OF INVENTION

In Japanese Laid-Open Patent Publication No. 2006-339035, the operating temperature of the fuel cell is considerably high. Therefore, the compression spring $5a$ of the first pressure applying mechanism $3a$ for applying the pressure to the cell stack $1a$ needs to be made of ceramics material having resistance to high temperature such as silicon nitride. Therefore, the cost for producing the first pressure applying mechanism $3a$ is high.

Further, since a ceramics spring is used as the compression spring $5a$, for example, the compression spring $5a$ can be damaged easily. Also, heat radiation from an upper portion of the stack is large, and thermally self-sustaining operation cannot be facilitated.

Further, in Japanese Laid-Open Patent Publication No. 2007-073359, the weight $7b$ is provided in the circular hole $6b$ formed at the center of the upper tightening plate $4b$. In the structure, the fuel cell becomes considerably large and heavy as a whole.

Further, since the heat capacitance of the weight $7b$ is large, load following capability during starting operation of the fuel cell, and during changes in the load for the fuel cell is poor. Therefore, such changes in the operation condition cannot be handled promptly. Moreover, since the weight $7b$ is made of metal having large heat conductivity, by heat transfer, heat radiation from an upper portion of the fuel cell is large.

Further, in Japanese Laid-Open Patent Publication No. 2009-500525 (PCT), the elastic pad is made of resin material such as silicone or polymer material. Therefore, heat resistance property of the material of the elastic pad is poor. Thus, the techniques of Japanese Laid-Open Patent Publication No. 2009-500525 (PCT) cannot be suitably applied to, especially, the solid oxide fuel cell operated at high temperature.

The present invention has been made to solve the problems of this type, and an object of the present invention is to provide a fuel cell stack having simple and compact structure in which the desired tightening load is applied to a solid oxide fuel cell reliably, and in which heat radiation is suppressed to achieve highly efficient power generation.

The present invention relates to a fuel cell stack including a stack body formed by stacking a plurality of solid oxide fuel cells. Each of the solid oxide fuel cells is formed by stacking an electrolyte electrode assembly between separators. The electrolyte electrode assembly includes an anode, a cathode, and an electrolyte interposed between the anode and the cathode.

The fuel cell stack includes a base member provided at one end of the stack body in a stacking direction, a mounting member provided at another end of the stack body in the stacking direction for applying a load to the stack body in the stacking direction, and a fuel cell support member positioned between the mounting member and the stack body. The fuel cell support member includes composite material of alumina fiber and vermiculite.

According to the present invention, the alumina fiber is elastic, and has good durability at high temperature, good heat insulating property and good electrically insulating property. Vermiculite has a high expansion coefficient at high temperature. Thus, the composite layer has good heat resistance property, good heat insulating property, and good heat expansion property, and it becomes possible to reliably apply the desired tightening load to the stack body because the tightening load can be easily adjusted in correspondence with the change in the temperature of the fuel cell stack. Thus, the stacking load applied to the fuel cell stack is stabilized, and improvement in the power generation performance is achieved. Further, heat radiation from the fuel cell stack is suitably suppressed, and thermally self-sustaining operation can be facilitated. The thermally self-sustaining operation herein means suitable operation of the fuel cell only using the heat generated by the fuel cell itself, without requiring any heat supplied from the outside.

Thus, it becomes possible to provide a fuel cell stack having simple and compact structure in which the desired tightening load is reliably applied to the solid oxide fuel cell, and heat radiation is suppressed to achieve the efficient operation.

DESCRIPTION OF EMBODIMENTS

Figure 1:
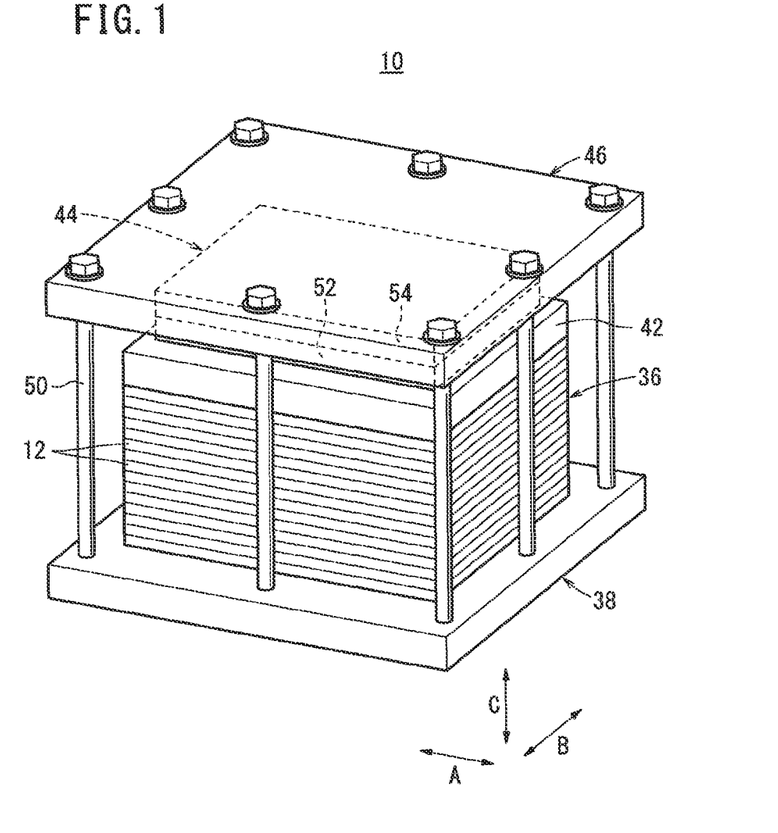
FIG. 1 is a perspective view schematically showing a fuel cell stack according to a first embodiment of the present invention.
Figure 2:
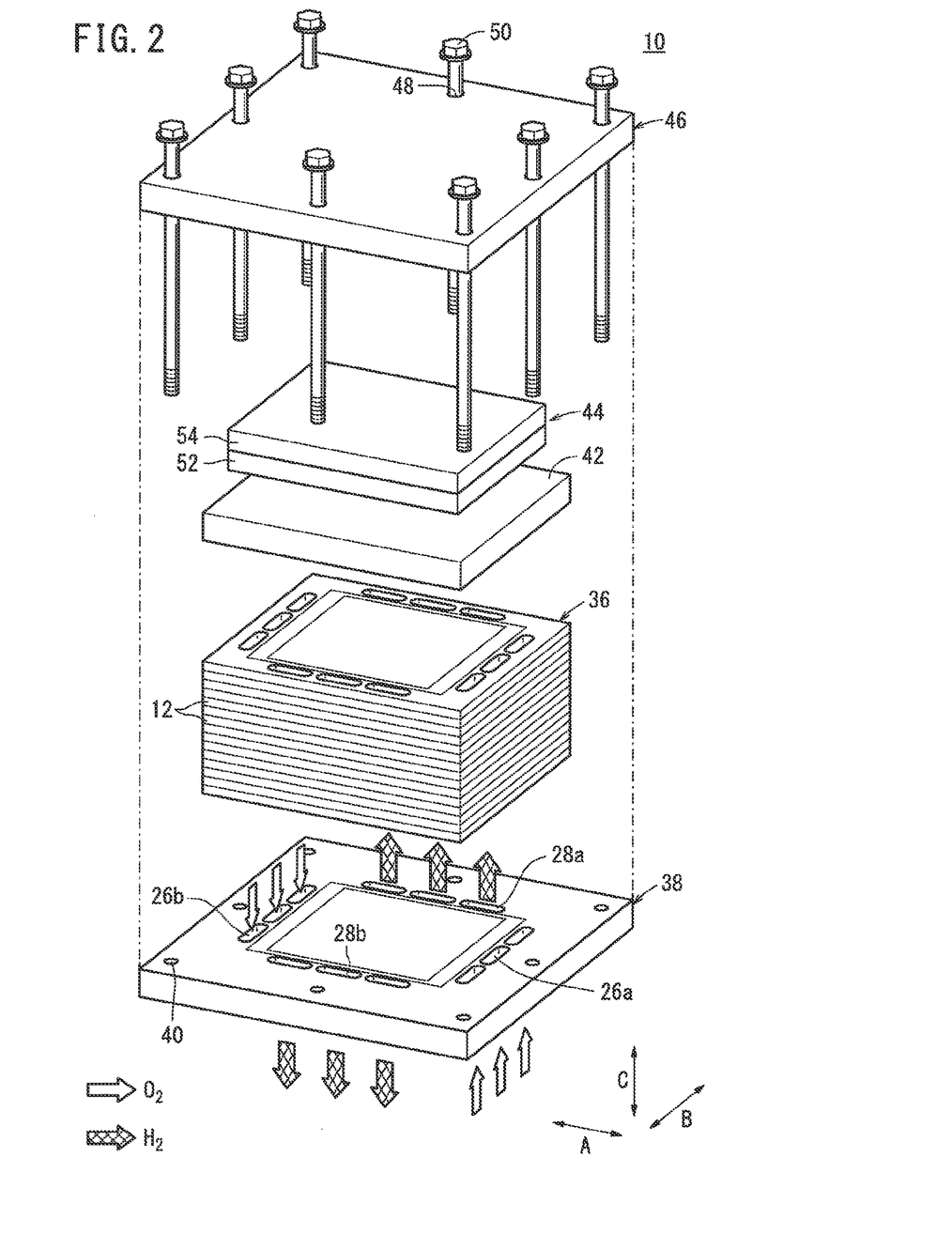
FIG. 2 is a partially-exploded perspective view showing the fuel cell stack.

As shown in FIGS. 1 and 2, a fuel cell stack 10 according to a first embodiment of the present invention is formed by stacking a plurality of solid oxide fuel cells 12 in a vertical direction indicated by an arrow C. The fuel cell stack 10 is used in various applications, including stationary and mobile applications. For example, the fuel cell stack 10 is mounted on a vehicle. The solid oxide fuel cell 12 performs power generation by electrochemical reactions of a fuel gas (hydrogen-containing gas such as a mixed gas of hydrogen gas, methane, and carbon monoxide) and an oxygen-containing gas (air).

Figure 3:
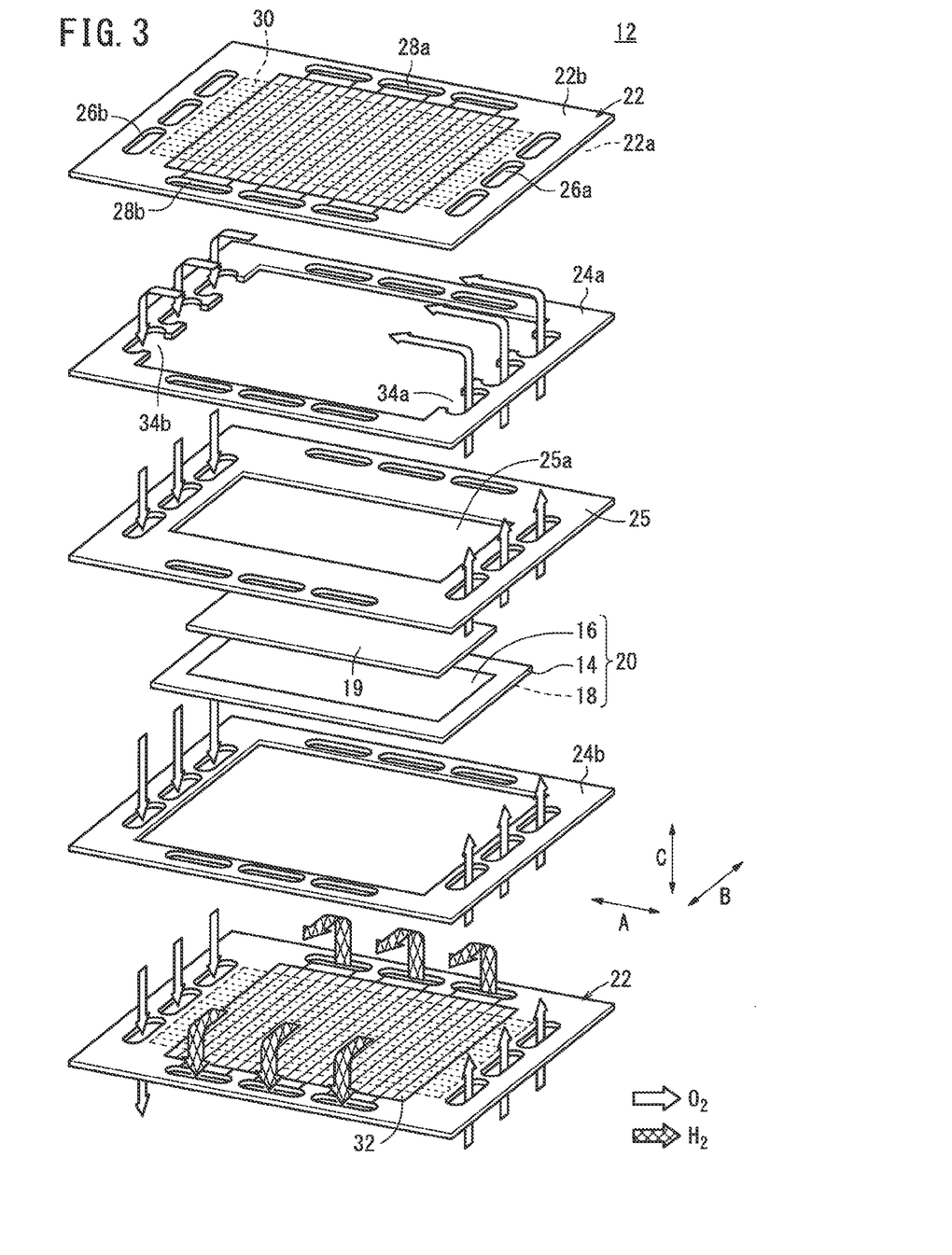
FIG. 3 is an exploded perspective view showing a solid oxide fuel cell of the fuel cell stack.

As shown in FIG. 3, a solid oxide fuel cell 12 includes electrolyte electrode assemblies 20. Each of the electrolyte electrode assembly (MEA) 20 includes a cathode 16, an anode 18, and an electrolyte (electrolyte plate) 14 interposed between the cathode 16 and the anode 18. For example, the electrolyte 14 is made of ion-conductive oxide such as stabilized zirconia. The surface area of the cathode 16 is smaller than the surface areas of the anode 18 and the electrolyte 14. A current collector 19 is stacked on the cathode 16. The current collector 19 has substantially the same size as the cathode 16. For example, the current collector 19 is in the form of foamed metal or metal mesh containing metal such as nickel.

The electrolyte electrode assembly 20 has a rectangular shape or a square shape, and a barrier layer (not shown) is provided at least at the outer edge of the electrolyte electrode assembly 20 for preventing the entry or discharge of the oxygen-containing gas and the fuel gas.

The solid oxide fuel cell 12 includes a single electrolyte electrode assembly 20 sandwiched between a pair of separators (interconnectors) 22. Further, seal members 24a, 24b and a metal plate 25 are interposed between the separators 22 and the electrolyte electrode assembly 20. For example, each of the separators 22 is a metal plate of, e.g., stainless alloy. For example, mica material, ceramic material or the like, i.e., crustal component material, glass material, and composite material of clay and plastic may be used for the seal members 24a, 24b. The metal plate 25 has a frame shape. An opening 25a formed inside the metal plate 25 is larger than the cathode 16, and smaller than the electrolyte 14. A wall around the opening 25a of the metal plate 25 is stacked on a portion around the electrolyte 14 to have a gas sealing function between the cathode 16 and the anode 18.

The separator 22 has a rectangular shape or a square shape. At one end of the separator 22 in a longitudinal direction indicated by an arrow A, a plurality of, e.g., three oxygen-containing gas supply passages 26a are arranged in a lateral direction indicated by an arrow B. At the other end of the separator 22 in the longitudinal direction indicated by the arrow A, a plurality of, e.g., three oxygen-containing gas discharge passages 26b are arranged in the direction indicated by the arrow B.

At one end of the separator 22 in the lateral direction indicated by the arrow B, for example, three fuel gas supply passages 28a are arranged in the direction indicated by the arrow A. At the other end of the separator 22 in the lateral direction, for example, three fuel gas discharge passages 28b are arranged in the direction indicated by the arrow A.

The separator 22 has an oxygen-containing gas channel 30 on its surface 22a facing the cathode 16 of the electrolyte electrode assembly 20 for supplying the oxygen-containing gas along the electrode surface of the cathode 16. The oxygen-containing gas channel 30 includes a plurality of flow grooves extending in the direction indicated by the arrow A. Both ends of the oxygen-containing gas channel 30 are terminated adjacent to the oxygen-containing gas supply passages 26a and the oxygen-containing gas discharge passages 26b.

The separator 22 has a fuel gas channel 32 on its surface 22b facing the anode 18 of the electrolyte electrode assembly 20 for supplying a fuel gas along the electrode surface of the anode 18.

The fuel gas channel 32 includes a plurality of flow grooves extending in the direction indicated by the arrow B. Both ends of the fuel gas channel 32 are connected to the fuel gas supply passages 28a and the fuel gas discharge passages 28b.

The oxygen-containing gas supply passages 26a, the oxygen-containing gas discharge passages 26b, the fuel gas supply passages 28a, and the fuel gas discharge passages 28b are formed in the seal members 24a, 24b. Inlet connection channels 34a for connecting the oxygen-containing gas supply passage 26a and the oxygen-containing gas channel 30 and outlet connection channels 34b for connecting the oxygen-containing gas discharge passage 26b and the oxygen-containing gas channel 30 are formed in the seal member 24a, 24b.

As shown in FIGS. 1 and 2, a plurality of the solid oxide fuel cells 12 are stacked together in the direction indicated by the arrow C to form a stack body 36. The stack body 36 is placed on a lower end plate (base member) 38 positioned at a lower end (one end) of the stack body 36 in the stacking direction indicated by the arrow C.

The dimensions of the lower end plate 38 in the directions indicated by the arrows A and B are larger than the dimensions of the stack body 36 in the directions indicated by the arrows A and B. The oxygen-containing gas supply passages 26a, the oxygen-containing gas discharge passages 26b, the fuel gas supply passages 28a, and the fuel gas discharge passages 28b are formed in the lower end plate 38 (see FIG. 2).

A plurality of screw holes 40 are formed along the marginal portion of the lower end plate 38. For example, the screw holes 40 are formed adjacent four corners of the lower end plate 38, and substantially central positions of the respective sides. Though not shown, manifolds for supplying and discharging the oxygen-containing gas and the fuel gas are attached to the lower end plate 38.

An upper end plate 42 is provided at an upper end (other end) of the stack body 36 in the stacking direction. The dimensions of the upper end plate 42 in the directions indicated by the arrows A and B are the same as the dimensions of the stack body 36 in the directions indicated by the arrows A and B. The upper end plate 42 is a flat rectangular or square plate.

A fuel cell support member 44 and a load plate (mounting member) 46 are stacked on the upper end plate 42. Holes 48 are formed along the marginal portion of the load plate 46, and bolts 50 are inserted into the holes 48. The bolts 50 are screwed into the screw holes 40 of the lower end plate 38.

The fuel cell support member 44 includes an alumina layer 52 and a composite layer 54. The alumina layer 52 is provided on the stack body 36 side, i.e., adjacent to the upper end plate 42, and the composite layer 54 is provided adjacent to the load plate 46.

The alumina layer 52 is made of alumina fiber. Specifically, the alumina layer 52 is formed by impregnating crystalline alumina fiber with an organic binder for compression in the thickness direction, and removing solvent portion of the organic binder by drying. The alumina layer 52 containing the alumina fiber has elasticity, good durability at high temperature and heat insulating property and electrically insulating property.

The composite layer 54 is made of composite material of alumina fiber and vermiculite. Specifically, the composite layer 54 is formed by dispersing vermiculite particles into slurry containing crystalline alumina fiber, and produced in the same manner as the above alumina layer.

The electrolyte electrode assembly 20 is made of material having a relatively small heat expansion coefficient in comparison with the bolt 50. Therefore, even if the bolt 50 is expanded in the axial direction, the tightening load for tightening the stack body 36 does not become significantly small due to the elasticity of the alumina layer 52.

Further, vermiculite has property to expand to a relatively large extent at high temperature. The expansion coefficient of this vermiculite is larger than the expansion coefficient of the bolt 50. Therefore, in particular, at high temperature, the tightening load for tightening the stack body 36 does not become significantly small.

At the time of assembling the fuel cell stack 10, after the stack body 36 is stacked on the lower end plate 38, the upper end plate 42 is stacked on the stack body 36. After the alumina layer 52 having a predetermined thickness and the composite layer 54 having a predetermined thickness are placed on the upper end plate 42, the load plate 46 is provided on the composite layer 54.

Then, the bolts 50 are inserted into the respective holes 48 of the load plate 46. Front ends of the bolts 50 are screwed into the screw holes 40 of the lower end plate 38. In the structure, the load in the stacking direction is applied to the stack body 36, and a compression load is applied to the fuel cell support member 44.

In the fuel cell support member 44, the alumina layer 52 and the composite layer 54 are compressed. After the fuel cell support member 44 applies a tightening load to generate a surface pressure required for the stack body 36, tightening of the bolts 50 is finished, and operation of assembling the fuel cell stack 10 is completed.

Operation of the fuel cell stack 10 will be described below.

As shown in FIG. 2, a fuel gas (e.g., hydrogen gas) and an oxygen-containing gas (e.g., air) are supplied to the lower end plate 38 of the fuel cell stack 10 through the manifolds (not shown). The air flows vertically upward along the oxygen-containing gas supply passages 26a.

In each of the solid oxide fuel cells 12, as shown in FIG. 3, the air flows through the inlet connection channels 34a of the seal member 24a connected to the oxygen-containing gas supply passages 26a, and then, the air is supplied to the oxygen-containing gas channel 30 of the separator 22. The air flows through the oxygen-containing gas channel 30 in the direction indicated by the arrow A, and the air is supplied to the cathode 16 of the electrolyte electrode assembly 20. Then, the air is discharged into the oxygen-containing gas discharge passage 26b.

The fuel gas flows vertically upward along the fuel gas supply passages 28a, and the fuel gas is supplied to the fuel gas channel 32 of the separator 22 of each solid oxide fuel cell 12. The fuel gas flows in the direction indicated by the arrow B along the fuel gas channel 32, and the fuel gas is supplied to the anode 18 of the electrolyte electrode assembly 20. Then, the fuel gas is discharged to the fuel gas discharge passage 28b.

Thus, in the electrolyte electrode assembly 20, the fuel gas is supplied to the anode 18, and the air is supplied to the cathode 16. Thus, oxide ions flow through the electrolyte 14 toward the anode 18 for generating electricity by electrochemical reactions.

In the first embodiment, the fuel cell support member 44 is interposed between the upper end plate 42 and the load plate 46, and the fuel cell support member 44 includes the alumina layer 52 and the composite layer 54.

The composite layer 54 includes alumina fiber with elasticity, having good durability, good heat insulating property, and good electrical insulating property at high temperature. Further, the composite layer 54 includes vermiculite having a high heat expansion coefficient at high temperature. Therefore, the composite layer 54 has good heat resistance property, good heat insulating property, and good heat expansion property, and it becomes possible to reliably apply the desired tightening load to the stack body 36 because the tightening load can be easily adjusted in correspondence with the change in the temperature of the fuel cell stack 10. Thus, the stacking load applied to the fuel cell stack 10 is stabilized, and improvement in the power generation performance is achieved.

Specifically, the bolt 50 is made of material having a large linear expansion coefficient such as nickel based heat resistant alloy. The heat expansion of the bolt 50 is considerably large in comparison with the electrolyte electrode assembly 20. Therefore, at high temperature, the bolt 50 is expanded in the stacking direction to a greater extent in comparison with the stack body 36. Therefore, the tightening load applied to the stack body 36 tends to be small.

At high temperature, heat expansion of vermiculite is large in comparison with the heat expansion of the bolt 50 in the axial direction. Therefore, it becomes possible to suitably suppress reduction in the tightening load applied to the stack body 36.

Further, in the first embodiment, the alumina layer 52 is provided adjacent to the upper end plate 42, and the composite layer 54 is provided adjacent to the load plate 46. The alumina layer 52 is made of alumina fiber. The alumina fiber is elastic, and has good heat resistance at high temperature. Further, alumina fiber has good heat insulating property and good electrical insulating property. Therefore, the alumina layer 52 can be suitably provided at the end of the stack body 36 operated at high temperature.

Moreover, since the alumina layer 52 has good heat insulating property, vermiculite of the composite layer 54 is not directly exposed to the heat from the stack body 36. Further, by heat expansion of the vermiculite, it becomes possible for the composite layer 54 to reliably apply the desired tightening load to the stack body 36, and the tightening load can be easily adjusted in correspondence with the change in the temperature of the fuel cell stack 10.

Since the alumina layer 52 has a considerably small Young's modulus, a large dimensional allowance for tightening can be adopted. Therefore, the dimensional change due to the heat of the stack body 36 can be absorbed sufficiently.

Elasticity of the alumina fiber can be maintained from normal temperature to hot temperature. Therefore, from the time of assembling the fuel cell stack 10, in the entire temperature range of operation such as steady operation and operation with load changes, the tightening load for tightening the fuel cell stack 10 can be maintained.

Further, since the alumina fiber has good heat insulating property, by providing the alumina fiber adjacent to the upper end plate 42, heat insulating property of the fuel cell stack 10 is improved. Thus, heat radiation from the fuel cell stack 10 is suitably suppressed, thermally self-sustaining operation can be facilitated, and improvement in the stack efficiency is achieved easily.

The fuel cell stack 10 is formed by stacking the solid oxide fuel cells 12 in the form of flat plates. Therefore, in particular, high temperature fuel cells such as the flat plate type solid oxide fuel cells can be used effectively.

Figure 5:
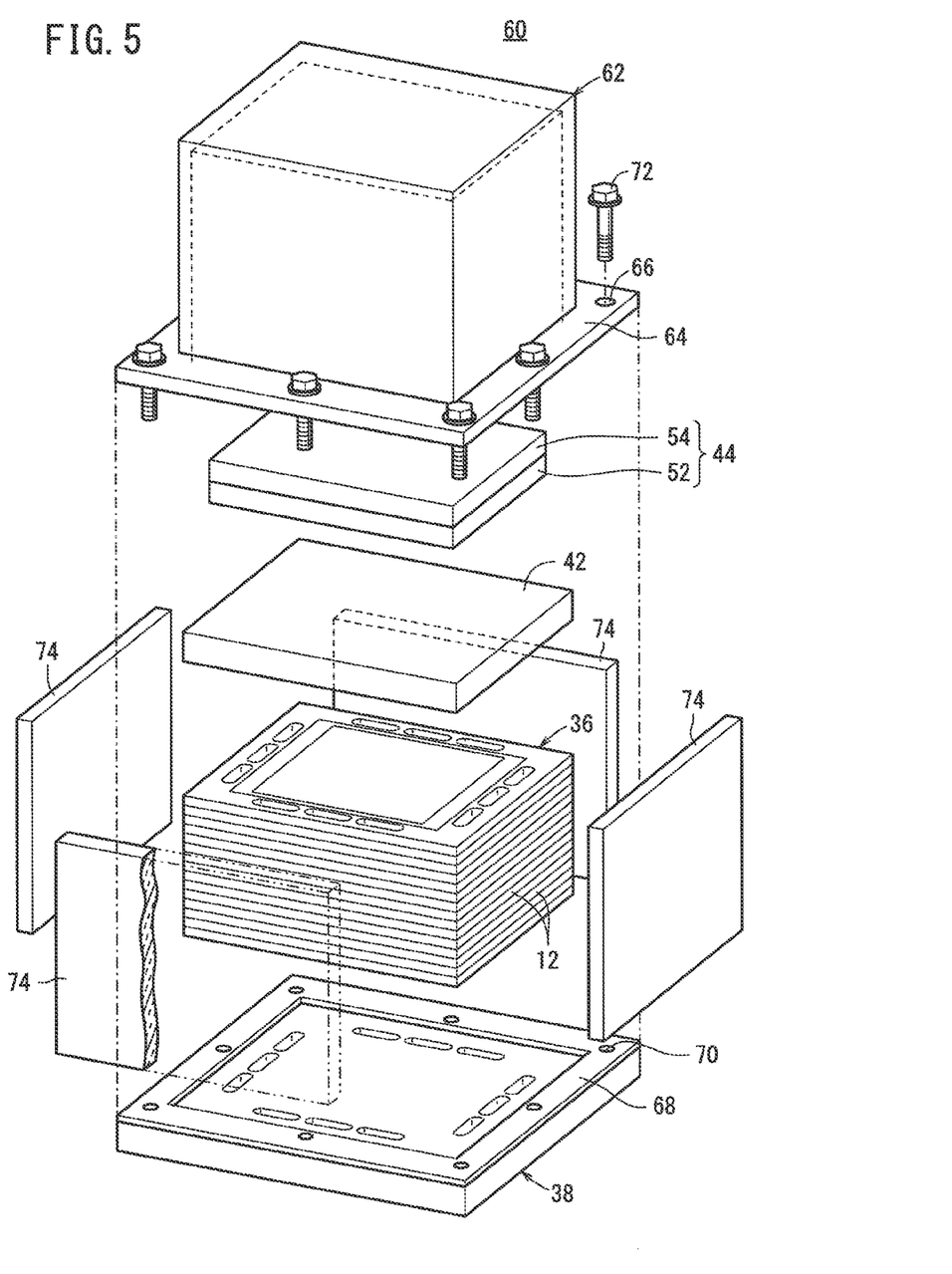
FIG. 5 is a partially-exploded perspective view showing the fuel cell stack.

FIG. 5 is a perspective view schematically showing a fuel cell stack 60 according to a second embodiment of the present invention.

The constituent elements that are identical to those of the fuel cell stack 10 according to the first embodiment are labeled with the same reference numerals, and description thereof will be omitted. Also in a third embodiment as described later, the constituent elements that are identical to those of the fuel cell stack 10 according to the first embodiment are labeled with the same reference numerals, and description thereof will be omitted.

Figure 4:
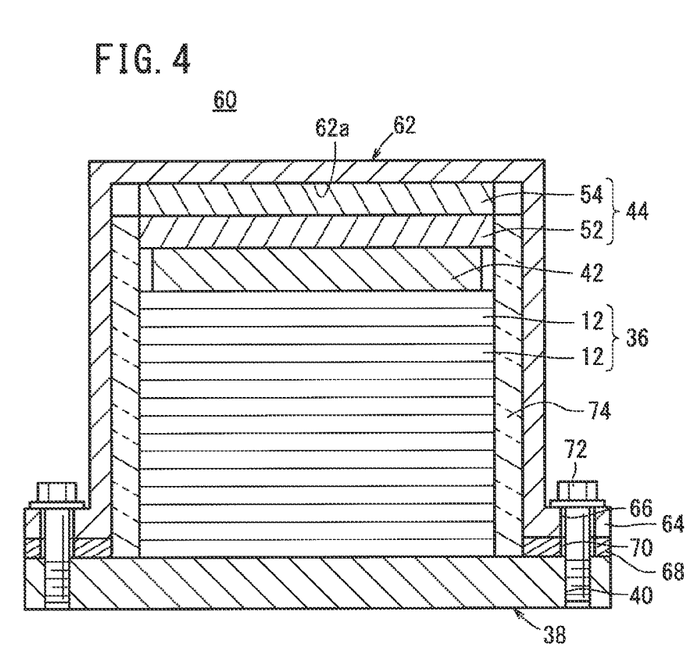
FIG. 4 is a cross sectional view showing a fuel cell stack according to a second embodiment of the present invention.

As shown in FIGS. 4 and 5, the fuel cell stack 60 includes a box 62 instead of the load plate 46 according to the first embodiment. For example, the box 62 is made of ferrite stainless material. At an end adjacent to the opening, a flange 64 protruding to the outside is provided, and a plurality of holes 66 are formed in the flange 64.

A seal member 68 is provided on the lower end plate 38. The seal member 68 has a frame shape, and a plurality of holes 70 are formed in the seal member 68 coaxially with the holes 66.

Bolts 72 are inserted into the holes 66, 70, and the bolts 72 are screwed into the screw holes 40 of the lower end plate 38 such that the bottom (mounting member) 62a of the box 62 presses the fuel cell support member 44 in the stacking direction. In the box 62, heat insulating member 74 is provided around the stack body 36. For example, the heat insulating member 74 has a rectangular shape, and made of mica, for example.

In the second embodiment, the heat expansion coefficient of vermiculite of the composite layer 54 is larger than the heat expansion coefficient of the box 62. Therefore, it becomes possible to suitably suppress reduction in the tightening load applied to the stack body 36 due to the expansion of the box 62 at high temperature. Thus, the same advantages as in the case of the first embodiment are obtained. For example, the desired tightening load is reliably applied to the stack body 36, and improvement in the power generation performance of the entire fuel cell stack 60 is achieved easily.

Further, in the second embodiment, the box 62 is made of ferrite stainless material. The ferrite stainless material is inexpensive, and has a small linear expansion coefficient. Therefore, the difference in the heat expansion between the box 62 and the stack body 36 becomes small, and further reduction in the load at high temperature is achieved. Moreover, the amount of heat resistant alloy used for the fuel cell stack 60 can be reduced, and the fuel cell stack 60 can be produced economically.

Further, in the box 62, the heat insulating member 74 is provided along side walls of the stack body 36. Thus, the box 62 has air-tight structure, and radiation of heat from the stack body 36 is suppressed, and improvement in the power generation efficiency is achieved easily.

Figure 6:
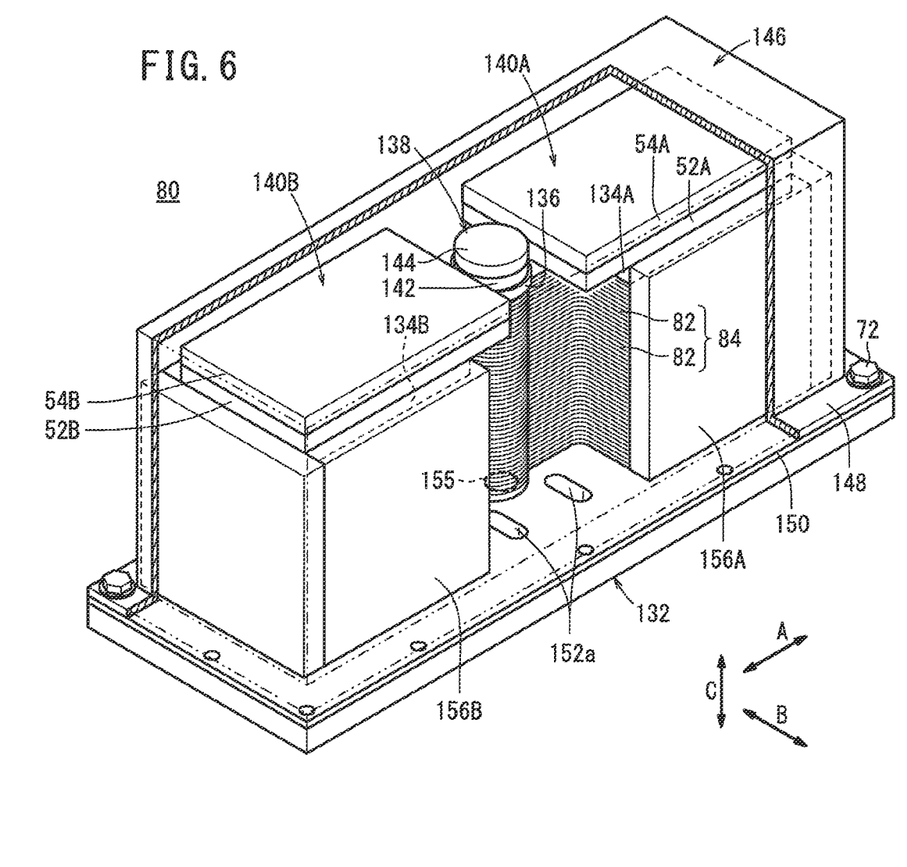
FIG. 6 is a perspective view schematically showing a fuel cell stack according to a third embodiment of the present invention.

FIG. 6 is a perspective view schematically showing a fuel cell stack 80 according to a third embodiment of the present invention.

Figure 7:
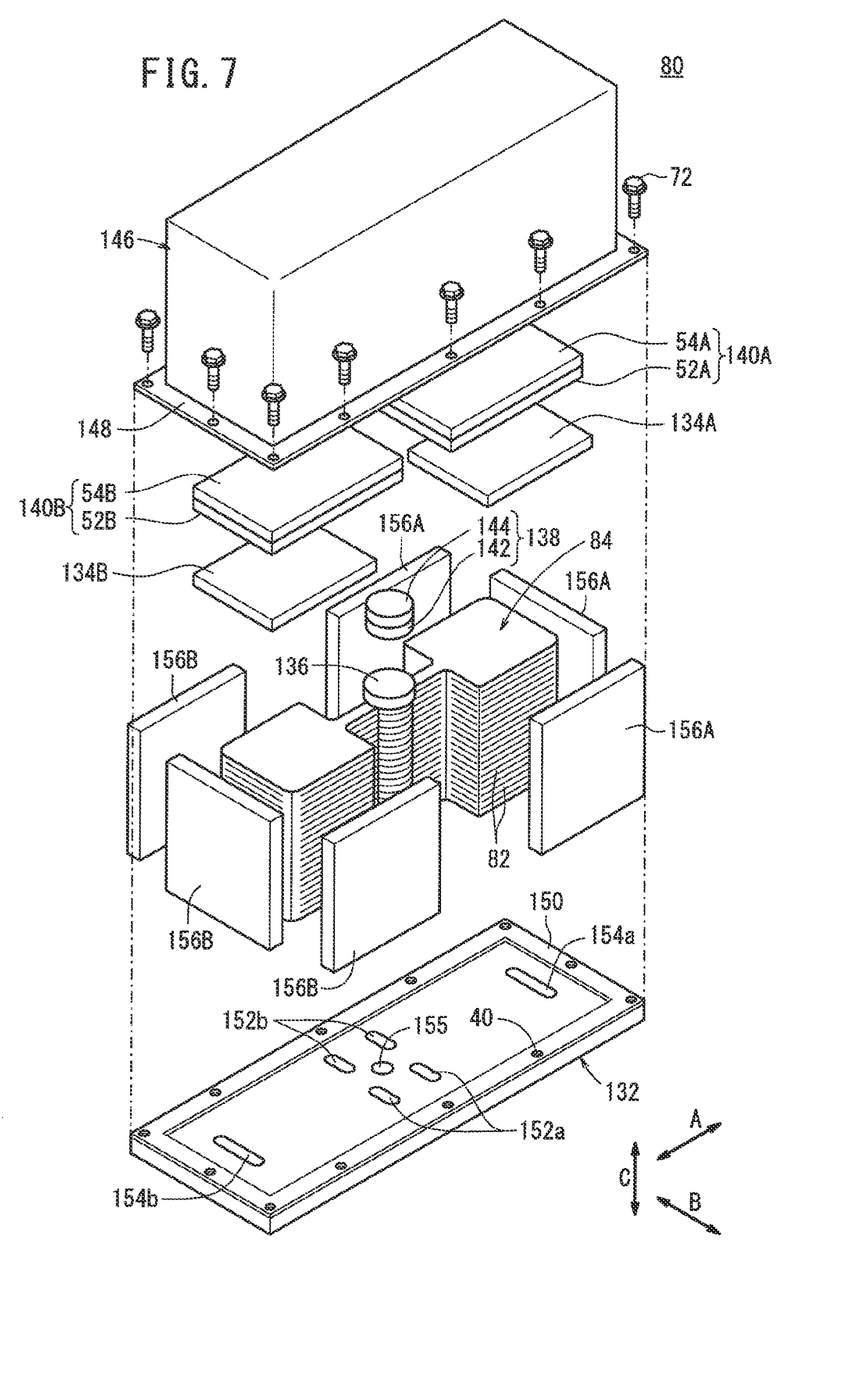
FIG. 7 is a partially-exploded perspective view showing the fuel cell stack.

As shown in FIGS. 6 and 7, the fuel cell stack 80 includes a plurality of solid oxide fuel cells 82 stacked in a direction indicated by an arrow C. A plurality of the solid oxide fuel cells 82 are stacked together to form a stack body 84.

Figure 8:
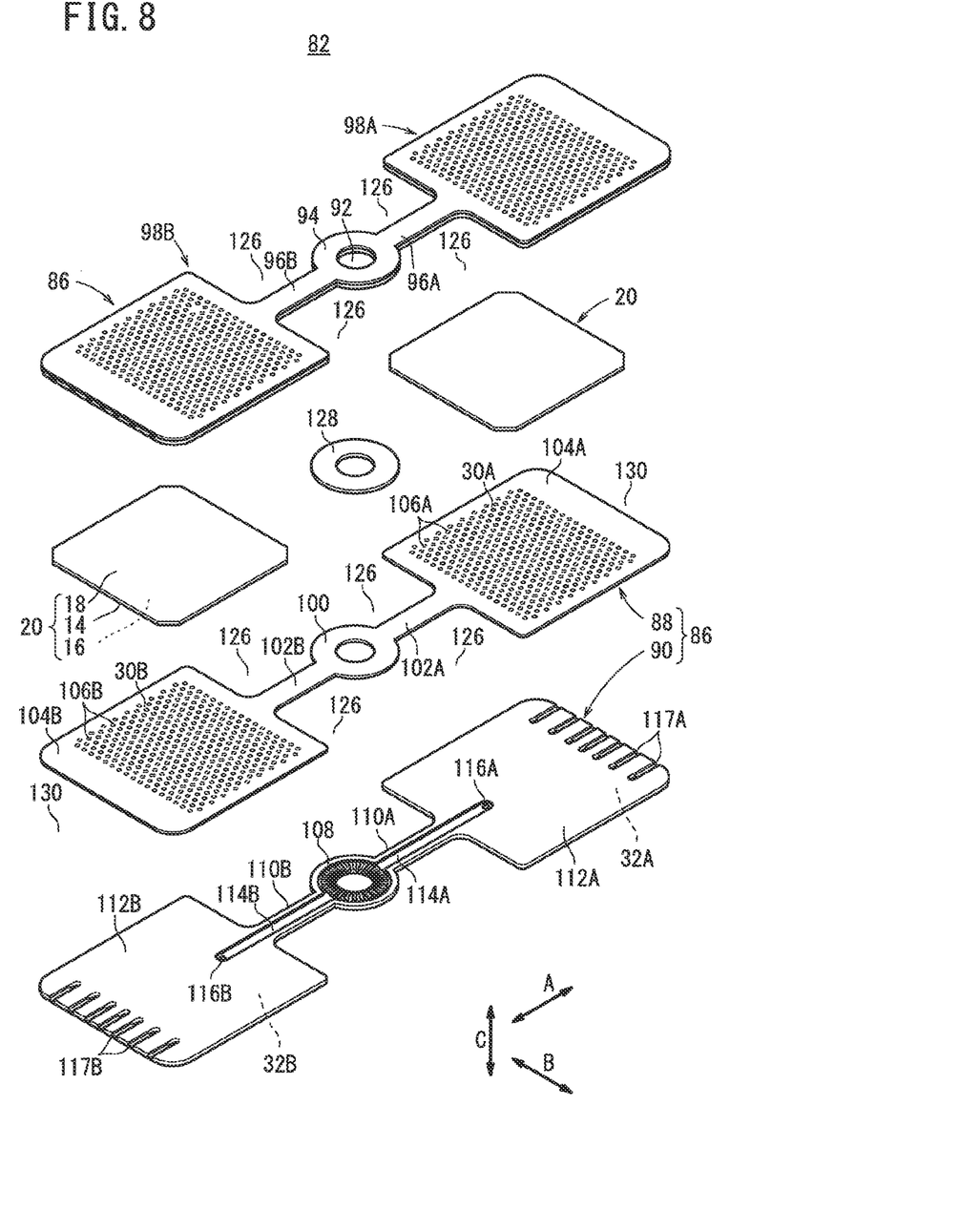
FIG. 8 is an exploded perspective view showing a solid oxide fuel cell of the fuel cell stack.

As shown in FIG. 8, the solid oxide fuel cell 82 includes a pair of separators 86 sandwiching two electrolyte electrode assemblies 20 positioned in the same plane. The separator 86 includes a first plate 88 and a second plate 90. For example, the first plate 88 and the second plate 90 are metal plates of stainless alloy or the like, and are joined to each other, e.g., by brazing, diffusion bonding, or laser welding.

The separator 86 has a fuel gas supply section (reactant gas supply section) 94, and a fuel gas supply passage (reactant gas supply passage) 92 extends through the center of the fuel gas supply section 94. A pair of bridge sections 96A, 96B are connected to the fuel gas supply section 94, and the bridge sections 96A, 96B extend in directions opposite to each other. Sandwiching sections 98A, 98B are provided integrally with the pair of bridge sections 96A, 96B at symmetrical positions with respect to the fuel gas supply section 94 positioned at the center.

The first plate 88 includes a first circular disk 100, and the fuel gas supply passage 92 extends through the first circular disk 100. First long plates 102A, 102B are provided integrally with the first circular disk 100. The first long plates 102A, 102B extend from the first circular disk 100 in directions opposite to each other. First rectangular sections 104A, 104B are provided integrally with the first long plates 102A, 102B. A plurality of protrusions 106A, 106B are formed on surfaces of the first rectangular sections 104A, 104B facing the cathodes 16. Oxygen-containing gas channels 30A, 30B are formed by the protrusions 106A, 106B, respectively.

The second plate 90 has a second circular disk 108, and the fuel gas supply passage 92 extends through the center of the second circular disk 108. Second long plates 110A, 110B are provided integrally with the second circular disk 108, and the second long plates 110A, 110B extend from the second circular disk 108 in directions opposite to each other. Second rectangular sections 112A, 112B are provided integrally with the second long plates 110A, 110B, respectively.

Fuel gas supply channels 114A, 114B are formed to extend from the second long plates 110A, 110B to the second rectangular sections 112A, 112B. Fuel gas inlets 116A, 116B are formed at positions where the fuel gas supply channels 114A, 114B are terminated. A plurality of fuel gas outlets 117A, 117B are formed on surfaces of the second rectangular sections 112A, 112B where the fuel gas supply channels 114A, 114B are formed.

Figure 9:
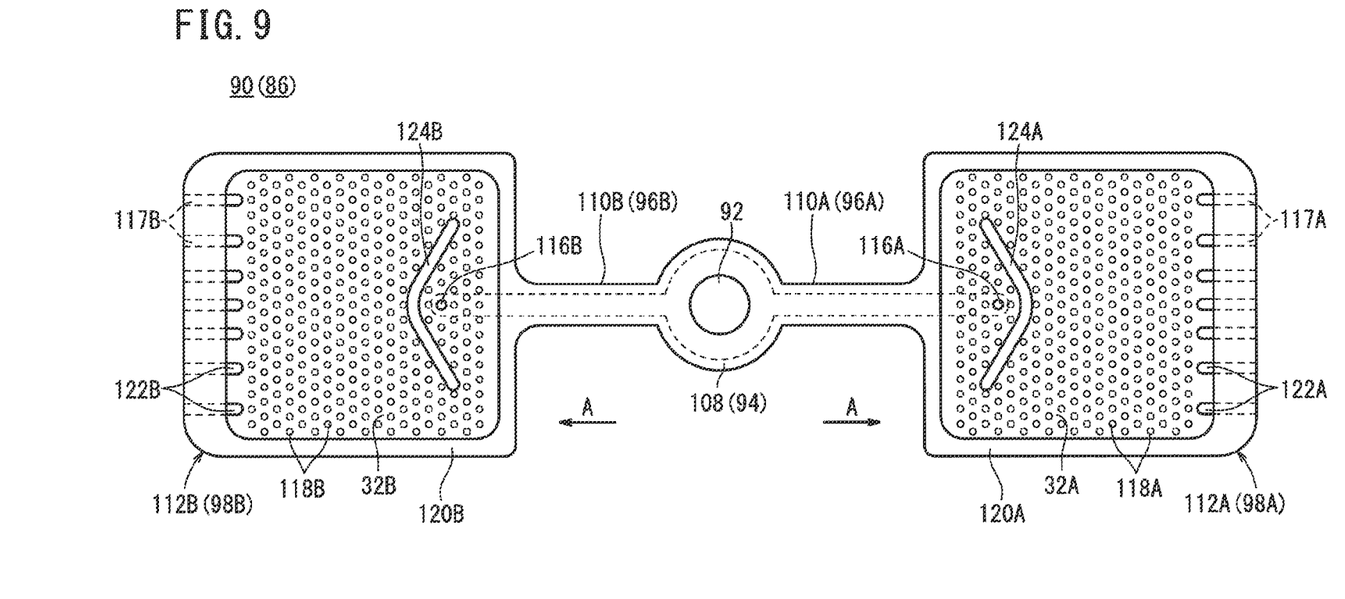
FIG. 9 is a view showing a second plate of the solid oxide fuel cell.

As shown in FIG. 9, a plurality of protrusions 118A, 118B are formed on surfaces of the second rectangular sections 112A, 112B which contact the anodes 18. Fuel gas channels 32A, 32B are formed by the protrusions 118A, 118B. The fuel gas channels 32A, 32B are surrounded by outer protrusions 120A, 120B, and through holes 122A, 122B connected to the fuel gas outlets 117A, 117B are formed in the fuel gas channels 32A, 32B. V-shaped detour path forming walls 124A, 124B are formed between the fuel gas inlets 116A, 116B and the fuel gas outlets 117A, 117B, respectively.

As shown in FIG. 8, oxygen-containing gas supply passages 126 are formed on both sides of the bridge sections 96A, 96B for supplying an oxygen-containing gas in the direction indicated by the arrow C. For example, the oxygen-containing gas flows vertically upward, and the oxygen-containing gas is supplied along the oxygen-containing gas channels 30A, 30B of each solid oxide fuel cell 82 in the direction indicated by the arrow A.

In a pair of separators 86 sandwiching the electrolyte electrode assemblies 20, an insulating seal 128 for sealing the fuel gas supply passage 92 is provided in each space between the fuel gas supply sections 94. For example, mica material, ceramic material or the like, i.e., crustal component material, glass material, and composite material of clay and plastic may be used for the insulating seal 128.

In each solid oxide fuel cell 82, exhaust gas discharge passages 130 are formed around the sandwiching sections 98A, 98B, on the outside in the direction indicated by the arrow A. The fuel gas and the oxygen-containing gas partially consumed in the reaction in the electrolyte electrode assembly 20 are discharged as the exhaust gas from the exhaust gas discharge passages 130 in the stacking direction.

As shown in FIGS. 6 and 7, the fuel cell stack 80 includes a lower end plate 132 provided at a lower end (one end) in the stacking direction of the stack body 84, upper end plates 134A, 134B provided at positions corresponding to the sandwiching sections 98A, 98B, at an upper end (the other end) in the stacking direction of the stack body 84, and a fuel seal plate 136 provided at a position corresponding to the fuel gas supply section 94.

A first fuel cell support member 138 is placed on the fuel seal plate 136, and second fuel cell support members 140A, 140B are positioned on the upper end plates 134A, 134B. These components form, the fuel cell support member as a whole.

The first fuel cell support member 138 includes an alumina layer 142 adjacent to the fuel seal plate 136, and a composite layer 144 stacked on the alumina layer 142. The alumina layer 142 and the composite layer 144 have a circular disk shape corresponding to the fuel seal plate 136.

The second fuel cell support members 140A, 140B include alumina layers 52A, 52B placed on the upper end plates 134A, 134B, and composite layers 54A, 545 stacked on the alumina layers 52A, 52B.

The alumina layers 142, 52A, 525 have structure identical to that of the alumina layer 52. The composite layers 144, 54A, 545 have structure identical to that of the composite layer 54.

For example, the first fuel cell support member 138 includes alumina fiber having a large compression amount, or having a large density, for allowing a large load to be applied in the stacking direction indicated by the arrow C, in comparison with the second fuel cell support members 140A, 1405.

The fuel cell stack 80 has a box 146, and a flange 148 is formed at an end of the opening of the box 146, and a seal member 150 is interposed between the flange 148 and the lower end plate 132. The flange 148 and the lower end plate 132 are fixed together using a plurality of bolts 72.

Figure 10:
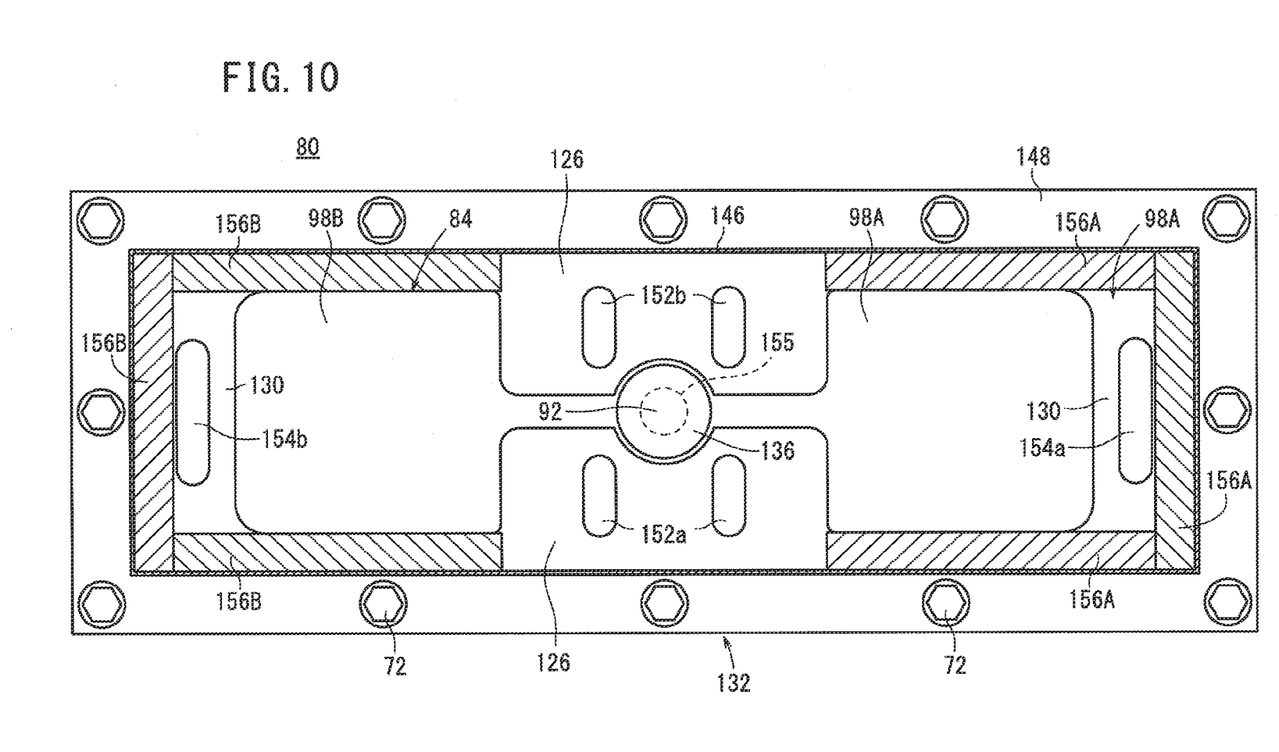
FIG. 10 is a plan view, partially in cross section, showing the fuel cell stack.

As shown in FIG. 10, two air holes 152$a$ and two air holes 152$b$ connected to the oxygen-containing gas supply passage 126, and two exhaust gas holes 154$a$, 154$b$ connected to the exhaust gas discharge passages 130 are formed in the lower end plate 132. Further, one fuel gas hole 155 connected to the fuel gas supply passage 92 is formed in the lower end plate 132.

As shown in FIGS. 6, 7, and 10, three heat insulating members 156A and three heat insulating members 156B are placed around three sides of each of the sandwiching sections 98A, 98B, between the stack body 84 and the box 146. For example, the heat insulating members 156A, 156B are made of heat insulating material such as mica.

Operation of the fuel cell stack 80 will be described below.

A fuel gas is supplied from the fuel gas hole 155 of the lower end plate 132 into the fuel gas supply passage 92 of the fuel cell stack 80. The air is supplied from the air holes 152$a$, 152$b$ of the lower end plate 132 into the oxygen-containing gas supply passage 126 of the fuel cell stack 80.

As shown in FIG. 8, in the separator 86 of each solid oxide fuel cell 82, the fuel gas supplied to the fuel gas supply passage 92 is supplied into the fuel gas supply channels 114A, 114B formed in the bridge sections 96A, 96B. The fuel gas from the fuel gas supply channels 114A, 114B flows through the fuel gas inlets 116A, 116B into the fuel gas channels 32A, 32B.

As shown in FIG. 9, by the guidance of the detour path forming walls 124A, 124B, the fuel gas supplied to the fuel gas channels 32A, 32B flows through the fuel gas channels 32A, 32B, and the fuel gas is supplied to the anodes 18 of the electrolyte electrode assemblies 20. Then, the fuel gas is discharged into the exhaust gas discharge passages 130 through the fuel gas outlets 117A, 117B.

The air supplied to the oxygen-containing gas supply passages 126 flows into the oxygen-containing gas channels 30A, 30B formed between the cathodes 16 of the electrolyte electrode assemblies 20 and the separator 86. Then, the oxygen-containing gas moves through the oxygen-containing gas channels 30A, 30B in the direction indicated by the arrow A, and supplied to the cathodes 16 of the electrolyte electrode assemblies 20. Then, the oxygen-containing gas is discharged into the exhaust gas discharge passage 130.

In the third embodiment, the first fuel cell support member 133 for applying a load to the fuel gas supply section 94 in the stacking direction and the second fuel cell support members 140A, 140B for applying a load to each of the sandwiching sections 98A, 98B corresponding to the electrolyte electrode assemblies 20, in the stacking direction are provided.

The first fuel cell support member 138 applies a large load in the stacking direction, in comparison with the second fuel cell support members 140A, 140B. In the structure, since a relatively large load is applied to the fuel gas supply section 94, the sealing performance of the fuel gas supply section 94 is maintained suitably.

In the meanwhile, a relatively small load enough to achieve tight contact between the electrolyte electrode assemblies 20 and the sandwiching sections 98A, 98B is applied to the electrolyte electrode assemblies 20. Therefore, damages of the electrolyte electrode assemblies 20 are prevented as much as possible, and power generation and current collection can be performed efficiently. Further, in the third embodiment, the same advantages as in the cases of the first and second embodiments are obtained.

The invention claimed is:

1. A fuel cell stack including a stack body formed by stacking a plurality of solid oxide fuel cells, the solid oxide fuel cells each formed by stacking an electrolyte electrode assembly between separators, the electrolyte electrode assembly including an anode, a cathode, and an electrolyte interposed between the anode and the cathode, the fuel cell stack comprising:

a base member provided at one end of the stack body in a stacking direction;

a mounting member provided at another end of the stack body in the stacking direction for applying a load to the stack body in the stacking direction; and a fuel cell support member positioned between the mounting member and the stack body, the fuel cell support member comprising composite material of alumina fiber and vermiculite, wherein the fuel cell support member comprises an alumina layer made of alumina fiber and a composite layer made of the composite material, and wherein the alumina layer is provided adjacent to the stack body, and the composite layer is provided adjacent to the mounting member.

2. The fuel cell stack according to claim 1, wherein the mounting member is a plate member provided in parallel with the base member; and the plate member and the base member are tightened together in the stacking direction using a plurality of bolts.

3. The fuel cell stack according to claim 1, wherein the mounting member is formed by a bottom of a box containing the stack body, and an end of an opening of the box is tightened in the stacking direction using a plurality of bolts, adjacent to the base member.

4. The fuel cell stack according to claim 1, wherein the solid oxide fuel cell is a flat plate stack type solid oxide fuel cell.

5. The fuel cell stack according to claim 1, wherein the separator comprises:

a sandwiching section sandwiching the electrolyte electrode assembly, a fuel gas channel for supplying a fuel gas along an electrode surface of the anode and an oxygen-containing gas channel for supplying an oxygen-containing gas along an electrode surface of the cathode being provided separately in the sandwiching section;

a bridge section connected to the sandwiching section, a reactant gas supply channel for supplying the fuel gas to the fuel gas channel or supplying the oxygen-containing gas to the oxygen-containing gas channel being formed in the bridge section; and a reactant gas supply section connected to the bridge section, a reactant gas supply passage for supplying the fuel gas or the oxygen-containing gas to the reactant gas supply channel extending through the reactant gas supply section in the stacking direction, and wherein the fuel cell support member includes a first fuel cell support member for applying a load to the reactant gas supply section in the stacking direction, and a second fuel cell support member for applying a load to the sandwiching section corresponding to the electrolyte electrode assembly, in the stacking direction; and the load applied by the first fuel cell support member is larger than the load applied by the second fuel cell support member, in the stacking direction.

6. The fuel cell stack according to claim 2, wherein a heat expansion coefficient of the vermiculite of the composite material is greater than that of the plurality of bolts.

7. The fuel cell stack according to claim 3, wherein a heat expansion coefficient of the vermiculite of the composite material is greater than that of the box.

* * * * *